United States Patent [19]
Krumwiede et al.

[11] Patent Number: 6,114,264
[45] Date of Patent: Sep. 5, 2000

[54] GRAY GLASS COMPOSITION

[75] Inventors: John F. Krumwiede, Cheswick; Anthony V. Longobardo, Butler; Larry J. Shelestak, Bairdford, all of Pa.

[73] Assignee: PPG Industries Ohio, Inc., Cleveland, Ohio

[21] Appl. No.: 08/414,165

[22] Filed: Mar. 31, 1995

Related U.S. Application Data

[63] Continuation of application No. 08/153,246, Nov. 16, 1993, abandoned.

[51] Int. Cl.$^7$ .............................. C03C 3/087; C03C 3/095
[52] U.S. Cl. ................................. 501/70; 501/64; 501/70; 501/905
[58] Field of Search ................................. 501/70, 71, 64, 501/905

[56] References Cited

U.S. PATENT DOCUMENTS

| Re. 25,312 | 1/1963 | Duncan et al. | 501/71 |
|---|---|---|---|
| Re. 34,639 | 6/1994 | Boulos, et al. | 501/71 |
| 2,524,719 | 10/1950 | Tillyer | 501/70 |
| 2,688,565 | 9/1954 | Raymond | 501/71 |
| 2,860,059 | 11/1958 | Molter et al. | 501/64 |
| 2,892,726 | 6/1959 | Smith et al. | 501/57 |
| 2,901,366 | 8/1959 | Smith et al. | 501/71 |
| 2,938,808 | 5/1960 | Duncan et al. | 501/71 |
| 3,143,683 | 8/1964 | Duncan et al. | 501/71 X |
| 3,294,556 | 12/1966 | Harrington | 501/71 |
| 3,294,561 | 12/1966 | Duncan et al. | 501/71 |
| 3,296,004 | 1/1967 | Duncan | 501/71 |
| 3,300,323 | 1/1967 | Plumat et al. | 501/70 |
| 3,411,934 | 11/1968 | Englehart et al. | 427/168 |

(List continued on next page.)

FOREIGN PATENT DOCUMENTS

| 596334 | 4/1990 | Australia . |
|---|---|---|
| 735187 | 5/1966 | Canada . |
| 0 297 404 | 1/1989 | European Pat. Off. . |
| 0 452 207 | 4/1991 | European Pat. Off. . |
| 0 536 049 | 4/1993 | European Pat. Off. . |
| 0561337 | 9/1993 | European Pat. Off. . |
| 0 565 882 A1 | 10/1993 | European Pat. Off. . |
| 2082647 | 12/1971 | France . |
| 2270215 | 4/1975 | France . |
| 2 331 527 | 11/1975 | France . |
| 2 672 587 | 8/1992 | France . |
| 2690437 | 10/1993 | France . |
| 1103527 | 3/1961 | Germany . |
| 55-23221 | 6/1980 | Japan . |
| 1041579 | 9/1981 | Japan . |
| 6340743 | 1/1988 | Japan . |
| 63277537 | 11/1988 | Japan . |
| 5-270855 | 10/1993 | Japan . |
| 1331492 | 9/1973 | United Kingdom . |
| 2 071 082 | 9/1981 | United Kingdom . |
| 2 252 973 | 8/1992 | United Kingdom . |
| 91/07356 | 5/1991 | WIPO . |
| 91/11402 | 8/1991 | WIPO . |

OTHER PUBLICATIONS

Chemical Abstract, vol. 84, 1976, Item 84:110350f JP 75 117 810, (No Month).

Glass Colors, V, Examples of the Composition of Colored Glasses, Kocik et al., Fachberichte, Sprechsaal, vol. 121, No. 1, 1988, 42–44, (No Month).

Patent Abstracts of Japan, JP 57106537, vol. 6, No. 197 Oct. 1982.

S. A. Glaverbel, "The Behavior of Selenium and Its Compounds During the Melting of a Vitrifiable Batch", presented at Symposium on Colored Glass in Prague (Sep. 1967).

"Iron–selenium black glass", A. Paul, Department of Glass Technology, University Sheffield, (No Date Available).

"Oxidation–Reduction Equilibria In Glass Between Iron and Selenium in Several Furnace Atmospheres", Frank Day, Jr. and Alexander Silverman, Journal of The American Ceramic Society, vol. 25, No. 13, pp. 371–381 1942, (No Month).

"Mechanism of selenium pink colouration in glass", A. Paul, Journal of Materials Science, pp 415–421 1975, (No Month).

"Selenium in Oxide Glasses, Methods for Increased Retention", W. C. LaCourse, M. Otteneyck and B. Ukwu, American Glass Review, No. 1980.

*Chemical Abstracts* entitled "Intermediate Reactions during Fusing of Selenium and Some of its Compounds in a Soda–Lime–Silicate Glass Frit", vol. 14. No. 10, p. 244, 1935, (No Month)

*Chemical Abstracts* entitled "Manufacture of Selecium Rose . . .", vol. 18, No. 6, p. 152 1938, (No Month).

"Selenium Dioxide as a Constituent of Glasses", L. Navias and J. Gallup, pp. 441–449, (No Date Available).

"Behavior of Selenium in Glass", The Glass Industry, Jul. 1934, pp. 122–125.

*Primary Examiner*—Karl Group
*Attorney, Agent, or Firm*—Andrew C. Siminerio

[57] ABSTRACT

The present invention provides a glass composition having a neutral gray color and a luminous (visible) transmittance within a range that allows the glass to be used in the forward vision areas of a vehicle. The base glass is a soda-lime-silica composition and iron, cobalt, selenium and/or nickel are added as colorants. In one particular embodiment of the invention which is essentially nickel-free, a neutral gray colored glass with a luminous transmittance (C.I.E. illuminant A) of 60% and higher at a thickness of 3.9 millimeters may be attained by using as colorants: 0.30 to 0.70 wt. % $Fe_2O_3$, no greater than 0.21 wt. % FeO, 3–50 PPM CoO and 1–15 PPM Se, and preferably 0.32 to 0.65 wt. % $Fe_2O_3$, 0.065 to 0.20 wt. % FeO, 5 to 40 PPM CoO and 1 to 9 PPM Se. In an alternate embodiment of the invention which includes nickel oxide as a colorant, a neutral gray colored glass with a luminous transmittance of 60% and higher at a thickness of 3.9 millimeters may be attained by using 0.15 to 0.65 wt. % $Fe_2O_3$, no greater than 0.18 wt. % FeO, 15–55 PPM CoO, 0–5 PPM Se and 25–350 PPM NiO as colorants, and preferably 0.17 to 0.60 wt. % $Fe_2O_3$, 0.04 to 0.16 wt. % FeO, 20 to 52 PPM CoO, 0 to 3 PPM Se and at least 50 PPM NiO.

35 Claims, No Drawings

U.S. PATENT DOCUMENTS

| | | | |
|---|---|---|---|
| 3,498,806 | 3/1970 | Hammer et al. | 501/71 |
| 3,628,932 | 12/1971 | Inoue et al. | 65/18 |
| 3,660,061 | 5/1972 | Donley et al. | 65/32 |
| 3,723,142 | 3/1973 | Kato et al. | 501/71 |
| 3,967,040 | 6/1976 | Plumat et al. | 428/410 |
| 4,101,705 | 7/1978 | Fischer et al. | 428/220 |
| 4,104,076 | 8/1978 | Pons | 501/66 |
| 4,129,434 | 12/1978 | Plumat et al. | 65/60.52 |
| 4,190,452 | 2/1980 | Fischer et al. | 501/66 |
| 4,294,881 | 10/1981 | Meyer et al. | 428/334 |
| 4,308,319 | 12/1981 | Michelotti et al. | 428/432 |
| 4,336,303 | 6/1982 | Rittler | 428/334 |
| 4,339,541 | 7/1982 | Dela Ruye | 501/71 |
| 4,521,454 | 6/1985 | Kandachi et al. | 427/168 |
| 4,617,206 | 10/1986 | Haisma et al. | 427/374.1 |
| 4,719,126 | 1/1988 | Henery | 427/165 |
| 4,719,127 | 1/1988 | Greenberg | 427/165 |
| 4,728,353 | 3/1988 | Thomas et al. | 65/60.1 |
| 4,792,536 | 12/1988 | Pecoraro et al. | 501/70 |
| 4,798,616 | 1/1989 | Knavish et al. | 65/135 |
| 4,866,010 | 9/1989 | Boulos et al. | 501/71 |
| 4,873,206 | 10/1989 | Jones | 501/71 |
| 4,971,843 | 11/1990 | Michelotti et al. | 428/34 |
| 5,023,210 | 6/1991 | Krumwiede et al. | 501/71 |
| 5,030,593 | 7/1991 | Heithoff | 501/72 |
| 5,070,048 | 12/1991 | Boulos et al. | 501/71 |
| 5,071,796 | 12/1991 | Jones et al. | 501/70 |
| 5,256,607 | 10/1993 | Kerko et al. | 501/65 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,318,931 | 6/1994 | Nakaguchi et al. | 501/64 |
| 5,364,820 | 11/1994 | Morimoto et al. | 501/71 |
| 5,478,783 | 12/1995 | Higby et al. | 501/71 |
| 5,582,455 | 12/1996 | Casariego et al. | 296/146.2 |

GRAY GLASS COMPOSITION

This is a continuation of application Ser. No. 08/153,246, filed Nov. 16, 1993, now abandoned.

BACKGROUND OF THE INVENTION

This invention involves a neutral gray colored glass that has a luminous transmittance that makes it highly desirable for use in forward vision areas of a vehicle, such as a windshield and front door windows. In particular, the glass has a luminous transmittance of 60% or greater and preferably 70% or greater. In addition, the glass of the present invention generally exhibits lower infrared and total solar energy transmittance comparable to typical green glasses used in automotive applications to reduce heat gain in the interior of the enclosure. The glass is also compatible with flat glass manufacturing methods.

Various heat-absorbing glass substrates are known in the art. The primary colorant in typical green tinted automotive glasses is iron, which is usually present in both the $Fe_2O_3$ and FeO forms. As is conventional, the total amount of iron present in a glass is expressed herein as $Fe_2O_3$, regardless of the form actually present. Typical green tinted automotive glass has about 0.5 percent by weight total iron, with the ratio of FeO to total iron being about 0.25.

Some glasses, e.g. U.S. Reissue Pat. No. 25,312 to Duncan et al., produce a gray color in the glass by including nickel oxide as a colorant. However, inclusion of nickel containing materials must be carefully controlled because the presence of nickel during the melting process sometimes leads to the formation of nickel sulfide stones in the glass. Additional potential problems faced when using nickel include haze formation on the glass surface due to reduction of the nickel in the tin bath and change in the glass color when it is heat treated.

To avoid this problem, nickel-free colored glasses containing iron oxide, cobalt oxide, and selenium were developed as disclosed in U.S. Pat. No. 3,296,004 to Duncan et al., U.S. Pat. No. 3,723,142 to Kato et al. and British Patent Specification 1,331,492 to Bamford. In U.S. Pat. No. 4,104,076 to Pons, instead of nickel, $Cr_2O_3$ or $UO_2$ are used in combination with iron oxide, cobalt oxide, and selenium to produce gray glass. A more recent, nickel-free version of gray glass is disclosed in U.S. Pat. No. 5,023,210 to Krumwiede et al. which uses iron oxide, cobalt oxide, selenium, and chromic oxide as colorants.

Many of the commercially available gray glasses are too dark to be used in the forward vision area of a vehicle. In addition, the lighter gray glasses exhibit solar performance properties inferior to those of conventional green automotive glass resulting in elevated interior vehicle temperatures which adversely affect occupant comfort. It would be desirable to have a neutral gray glass that may be used for the vision area of a vehicle, have acceptable solar performance properties and further that is compatible with commercial flat glass manufacturing techniques.

SUMMARY OF THE INVENTION

The present invention provides a glass composition having a neutral gray color and a luminous (visible) transmittance within a range that allows the glass to be used in the forward vision areas of a vehicle or as privacy glazing in a vehicle. The glass of the present invention has a standard soda-lime-silica flat glass base composition. It has been found that a neutral gray colored glass with a luminous transmittance of 60% and higher at a thickness of 3.9 millimeters may be attained by using as colorants: 0.30 to 0.70 wt. % $Fe_2O_3$, no greater than 0.21 wt. % FeO, 3–50 PPM CoO and 1–15 PPM Se. A preferred embodiment of such a glass composition includes 0.32 to 0.65 wt. % $Fe_2O_3$, 0.065 to 0.20 wt. % FeO, 5 to 40 PPM CoO and 1 to 9 PPM Se. When the luminous transmittance is 70% and greater, the colorants used to produce the neutral gray glass of the present invention include 0.30 to 0.70 wt. % $Fe_2O_3$, up to 0.19 wt. % FeO, 3 to 35 PPM CoO and 0 to 10 PPM Se, and preferably 0.32 to 0.65 wt. % $Fe_2O_3$, 0.065 to 0.175 wt. % FeO, 5 to 32 PPM CoO and 1 to 5 PPM Se. In addition, it is preferred that when the luminous transmittance is 70% or greater, the total solar energy transmittance should be no greater than 65%, and more preferably, no greater than 60%.

An alternate embodiment of the invention further includes nickel oxide as a colorant. In particular, it has also been found that a neutral gray colored glass with a luminous transmittance of 60% and higher at a thickness of 3.9 millimeters may be attained by using as colorants: 0.15 to 0.65 wt. % $Fe_2O_3$, no greater than 0.18 wt. % FeO, 15–55 PPM CoO, 0–5 PPM Se and 25–350 PPM NiO. A preferred embodiment of such a glass composition includes 0.17 to 0.60 wt. % $Fe_2O_3$, 0.04 to 0.16 wt. % FeO, 20 to 52 PPM CoO, 0 to 3 PPM Se and at least 50 PPM NiO. When the desired luminous transmittance is 70% and greater, the colorants used to produce this alternate neutral gray glass of the present invention include 0.15 to 0.50 wt. % $Fe_2O_3$, up to 0.14 wt. % FeO, 20 to 30 PPM CoO, 0 to 3 PPM Se and 25–200 PPM NiO, and preferably 0.20 to 0.43 wt. % $Fe_2O_3$, 0.05 to 0.11 wt. % FeO, 22 to 27 PPM CoO, 0 to 2 PPM Se and at least 50 PPM NiO.

The dominant wavelength of the glasses in the present invention may vary somewhat in accordance with particular color preferences. In the present invention, it is preferred that the glass be a neutral gray color characterized by dominant wavelengths in the range of 480 to 580 nanometers, preferably 485 to 540 nanometers, with an excitation purity of no higher than 8%, preferably no higher than 3%.

DETAILED DESCRIPTION

The base glass of the present invention, that is, the major constituents of the glass without colorants, is commercial soda-lime-silica glass characterized as follows:

|  | Weight % |
|---|---|
| $SiO_2$ | 66–75 |
| $Na_2O$ | 10–20 |
| CaO | 5–15 |
| MgO | 0–5 |
| $Al_2O_3$ | 0–5 |
| $K_2O$ | 0–5 |
| BaO | 0–1 |

To this base glass the present invention adds colorants in the form of iron, cobalt, selenium and/or nickel. In one particular embodiment of the invention, the glass is essentially nickel-free; that is, no deliberate addition of nickel or nickel compounds is made, although the possibility of traces of nickel due to contamination may not always be avoided. The glass in the present invention is essentially free of other colorants. It should be appreciated that the glass compositions disclosed herein may include small amounts of other materials, for example melting and refining aids, tramp materials or impurities. Such materials may include, but are not limited to chromium, manganese, cerium, molybdenum, titanium, chlorine, zinc, zirconium, sulfur, fluorine, lithium and strontium. It should be further appreciated that some of these materials as well as others may be added to the glass to improve the solar performance of the glass as will be discussed later in more detail.

The selenium colorant contributes a pink color to the glass as well as a brown color when complexed with iron to form iron selenide (FeSe). Cobalt produces a blue color. Iron contributes yellow and blue in varying proportions depending upon the oxidation state. Nickel, if used, contributes a green-brown to yellow-brown color.

The glass of the present invention may be melted and refined in a continuous, large-scale, commercial melting operation and formed into flat glass sheets of varying thicknesses by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least 0.05 wt. % in the first few microns below the surface of the glass that was in contact with the tin.

The total amount of iron present in the glass is expressed herein in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). Unless stated otherwise, the term $Fe_2O_3$ in this specification shall mean total iron expressed in terms of $Fe_2O_3$ and the term FeO shall mean iron in the ferrous state expressed in terms of FeO.

The glass compositions disclosed in the present invention may be made using any of several types of melting arrangements, such as but not limited to, a conventional, overhead fired continuous melting operation as is well known in the art or a multi-stage melting operation, of the type that is discussed later in more detail. However, for glass compositions having a redox of less than 0.30, the former operation is preferred and for glass compositions having a redox of 0.30 or greater, the latter operation is preferred.

Conventional, overhead fired continuous melting operations are characterized by depositing batch material onto a pool of molten glass maintained within a tank type melting furnace and applying thermal energy until the materials are melted into the pool of molten glass. The melting tanks conventionally contain a large volume of molten glass so as to provide sufficient residence time for currents in the molten glass to affect some degree of homogenization and fining before the glass is discharged into a forming operation.

The multi-stage glass melting and refining operation disclosed in U.S. Pat. Nos. 4,381,934 and 4,792,536 to Kunkle et al., U.S. Pat. No. 4,792,536 to Pecoraro et al. and U.S. Pat. No. 4,886,539 to Cerutti et al. is characterized by separate stages whereby more flexibility in controlling redox conditions is provided. The overall melting process disclosed in these patents consists of three stages: a liquefaction stage, a dissolving stage, and a vacuum refining stage. In the liquefaction stage, batch materials, preferably in a pulverulent state, are fed into a rotating, drum-shaped liquefying vessel. As batch material is exposed to the heat within the vessel, liquefied material flows down a sloped batch material lining to a central drain opening at the bottom of the vessel. A stream of liquefied material falls freely from the liquefaction vessel into a dissolving vessel for the dissolving stage. The dissolving vessel completes the dissolution of unmelted particles in the liquefied material coming from the liquefaction stage by providing residence time at a location isolated from the downstream refining stage. The dissolving vessel may be in the form of a horizontally elongated refractory basin with the inlet and outlet at opposite ends thereof so as to assure adequate residence time. The refining stage preferably consists of a vertically upright vessel that may be generally cylindrical in configuration having an interior ceramic refractory lining shrouded in a gas-tight, water-cooled casing. As the molten material enters the vessel from the dissolving vessel, it encounters a reduced pressure within the refining vessel. Gases included in the melt expand in volume, creating a foam. As foam collapses, it is incorporated into the liquid body held in the refining vessel. Refined molten material is drained from the bottom of the refining vessel into a receiving chamber and delivered to a float forming chamber.

A stirring arrangement may be employed in the multi-stage process to homogenize the glass after it has been refined in order to produce glass of the highest optical quality. If desired, a stirring arrangement may be integrated with a float forming chamber, whereby the glass in the stirring chamber rests on a layer of molten metal. The molten metal may be continuous with the molten metal constituting the support in the forming chamber, and is usually comprised essentially of tin.

The multi-stage operation discussed above generally operates at a redox level of 0.30 or higher; however redox levels below 0.30 may be achieved by increasing the amount of oxidizing constituents in the glass batch. For example, manganese oxide may be added to lower the redox level. Redox may also be controlled by adjusting the gas/$O_2$ ratio of the burners.

The transmittance data provided throughout this disclosure is based on a glass thickness of 3.9 millimeters (0.154 inch). Luminous transmittance (LTA) is measured using C.I.E. 1931 standard illuminant "A" over the wavelength range 380 to 770 nanometers at 10 nanometer intervals. Total solar ultraviolet transmittance (TSUV) is measured over the wavelength range 300 to 390 nanometers at 10 nanometer intervals. Total solar infrared transmittance (TSIR) is measured over the wavelength range 800 to 2100 nanometers at 50 nanometer intervals. Total solar energy transmittance (TSET) represents a computed value based on measured transmittances from 300 to 2100 nanometers at 50 nanometer intervals. All solar transmittance data is calculated using Parry Moon air mass 2.0 solar data. Glass color in terms of dominant wavelength and excitation purity are measured using C.I.E. 1931 standard illuminant "C" with a 2° observer.

To determine this transmittance data, the transmittance values are integrated over the wavelength range [a,b]. This range is divided into n equal subintervals of length h by points $\{X_0, X_1, \ldots, X_n\}$ where $X_i = a + (i \times h)$. In the present disclosure, the Rectangular Rule is used to compute the transmittance data. An interpolating function is used to approximate the integrand $f$ in each subinterval. The sum of integrals of this function provides an approximation of the integral:

$$I = \int_b^a f(X) dX$$

In the case of the Rectangular Rule, a constant value $f(X_i)$ is used as an approximation of $f(X)$ on $[X_{i-1}, X_i]$. This yields a step-function approximation of $f(X)$ on $[a,b]$, and the numerical integration formula:

$$I = \sum_{i=1}^{n} f(X_i) \times h$$

Tables 1, 2 and 3 illustrate examples of glass compositions at a 3.9 mm (0.154 in.) reference thickness which embody the principles of the present invention. Only the colorant portions of the examples are listed in the table below, with $Fe_2O_3$ being total iron, including that present as FeO.

The information provided in Tables 1 and 2 is based on a computer model that generates theoretical spectral properties based on the glass compositions. The compositions in Table 1 exclude nickel oxide as a colorant while the compositions in Table 2 include nickel oxide as a colorant. The information provided in Example 25 of Table 3 is based on an experimental laboratory melt. The remaining information in Table 3 is based on actual glass produced using the multi-stage melting process discussed earlier. However, under certain conditions, it is preferred that the glasses disclosed in the present invention be made using a conventional, overhead fired continuous melting process as discussed earlier.

It should be noted that the modeled compositions in Table 1 included from 6 to 10 PPM of $Cr_2O_3$ and 1 PPM NiO, both of which are considered to be tramp and/or residual material levels, to better reflect the expected spectral properties of the glass. The compositions in Table 2 included similar $Cr_2O_3$ levels. In addition, the analysis of the experimental melt Example 25 in Table 3 showed less than 3 PPM NiO and 10 PPM $Cr_2O_3$. The analysis of the actual production glass disclosed in Table 3 showed less than 3 PPM NiO and between 5 PPM $Cr_2O_3$.

The representative base glass composition for the examples is as follows:

|         | Examples 1–25  | Examples 26–29 |
|---------|----------------|----------------|
| $SiO_2$ | 72.8% by weight | 72.0% by weight |
| $Na_2O$ | 13.8           | 13.5           |
| CaO     | 8.8            | 8.8            |
| MgO     | 3.8            | 3.8            |
| $Al_2O_3$ | 0.13         | 0.59           |

It should be appreciated that this composition may vary especially as a result of the actual amount of colorant present in the glass composition.

TABLE 1

|            | Ex. 1  | Ex. 2  | Ex. 3  | Ex. 4  | Ex. 5  | Ex. 6  | Ex. 7  | Ex. 8  |
|------------|--------|--------|--------|--------|--------|--------|--------|--------|
| $Fe_2O_3$ wt. % | 0.570 | 0.570 | 0.340 | 0.570 | 0.650 | 0.425 | 0.650 | 0.325 |
| FeO wt. %  | 0.145  | 0.145  | 0.087  | 0.145  | 0.195  | 0.109  | 0.175  | 0.065  |
| Redox      | 0.255  | 0.255  | 0.255  | 0.255  | 0.300  | 0.255  | 0.269  | 0.200  |
| CoO PPM    | 40     | 40     | 40     | 22     | 20     | 20     | 15     | 32     |
| Se PPM     | 9      | 5      | 7      | 7      | 3.5    | 6      | 2.5    | 5      |
| LTA        | 59.67  | 63.13  | 65.30  | 65.57  | 66.61  | 69.79  | 69.80  | 70.02  |
| TSIR       | 36.74  | 36.86  | 52.76  | 36.84  | 27.46  | 46.32  | 30.97  | 60.63  |
| TSUV       | 34.53  | 37.27  | 45.99  | 35.95  | 39.85  | 45.43  | 39.42  | 49.67  |
| TSET       | 47.60  | 49.55  | 59.20  | 49.95  | 45.87  | 57.39  | 48.99  | 65.50  |
| DW nm      | 558.9  | 493.9  | 497.4  | 562.7  | 493.5  | 551.3  | 498.1  | 490.6  |
| Pe %       | 2.02   | 2.46   | 0.39   | 3.36   | 3.7    | 1.3    | 2.7    | 1.02   |

|            | Ex. 9  | Ex. 10 | Ex. 11 | Ex. 12 | Ex. 13 | Ex. 14 | Ex. 15 | Ex. 16 |
|------------|--------|--------|--------|--------|--------|--------|--------|--------|
| $Fe_2O_3$ wt. % | 0.600 | 0.650 | 0.425 | 0.600 | 0.325 | 0.425 | 0.425 | 0.425 |
| FeO wt. %  | 0.175  | 0.109  | 0.128  | 0.150  | 0.085  | 0.108  | 0.109  | 0.109  |
| Redox      | 0.292  | 0.167  | 0.300  | 0.250  | 0.262  | 0.255  | 0.255  | 0.255  |
| CoO PPM    | 15     | 20     | 20     | 15     | 25     | 20     | 20     | 5      |
| Se PPM     | 2.5    | 3.5    | 3.5    | 2.5    | 4.5    | 3.5    | 1      | 3.5    |
| LTA        | 70.10  | 70.71  | 71.12  | 71.31  | 71.48  | 72.06  | 74.43  | 76.57  |
| TSIR       | 30.97  | 46.36  | 41.27  | 36.01  | 53.57  | 46.36  | 46.40  | 46.41  |
| TSUV       | 42.05  | 35.29  | 48.81  | 40.56  | 51.82  | 47.38  | 49.41  | 47.48  |
| TSET       | 49.30  | 57.25  | 55.68  | 52.38  | 62.48  | 58.65  | 59.99  | 60.16  |
| DW nm      | 494.9  | 553.8  | 491.7  | 501.7  | 491.2  | 496.6  | 490.2  | 555.0  |
| Pe %       | 3.2    | 2.81   | 2.58   | 1.97   | 1.41   | 1.58   | 3.46   | 2.15   |

TABLE 2

|            | Ex. 17 | Ex. 18 | Ex. 19 | Ex. 20 | Ex. 21 | Ex. 22 | Ex. 23 | Ex. 24 |
|------------|--------|--------|--------|--------|--------|--------|--------|--------|
| $Fe_2O_3$ wt. % | 0.170 | 0.170 | 0.270 | 0.600 | 0.425 | 0.425 | 0.200 | 0.300 |
| FeO wt. %  | 0.044  | 0.044  | 0.069  | 0.160  | 0.108  | 0.108  | 0.051  | 0.077  |
| Redox      | 0.255  | 0.255  | 0.255  | 0.267  | 0.255  | 0.255  | 0.255  | 0.255  |
| CoO PPM    | 52     | 40     | 40     | 20     | 25     | 22     | 27     | 22     |
| Se PPM     | 0      | 0      | 0      | 0      | 3      | 0      | 0      | 0.5    |
| NiO PPM    | 300    | 300    | 200    | 150    | 50     | 100    | 150    | 100    |

TABLE 2-continued

|  | Ex. 17 | Ex. 18 | Ex. 19 | Ex. 20 | Ex. 21 | Ex. 22 | Ex. 23 | Ex. 24 |
|---|---|---|---|---|---|---|---|---|
| $LT_A$ | 59.95 | 62.64 | 64.88 | 65.33 | 68.94 | 70.31 | 70.86 | 72.19 |
| TSIR | 67.63 | 67.67 | 58.20 | 33.48 | 46.15 | 46.01 | 65.42 | 56.06 |
| TSUV | 64.02 | 64.12 | 56.53 | 42.58 | 47.63 | 50.00 | 63.80 | 56.60 |
| TSET | 65.62 | 66.56 | 62.48 | 48.63 | 57.30 | 57.95 | 68.96 | 64.29 |
| DW nm | 511.2 | 558.3 | 499.8 | 509.8 | 498.0 | 497.5 | 498.0 | 498.0 |
| Pe % | 0.88 | 2.42 | 1.54 | 2.07 | 1.61 | 2.29 | 1.26 | 1.55 |

TABLE 3

|  | Ex. 25 | Ex. 26 | Ex. 27 | Ex. 28 | Ex. 29 |
|---|---|---|---|---|---|
| $Fe_2O_3$ wt. % | 0.432 | 0.404 | 0.377 | 0.371 | 0.415 |
| FeO wt. % | 0.109 | 0.115 | 0.107 | 0.107 | 0.111 |
| Redox | 0.252 | 0.285 | 0.283 | 0.289 | 0.268 |
| CoO PPM | 19 | 14 | 19 | 23 | 18 |
| Se PPM | 5 | 5 | 4 | 3 | 3 |
| $LT_A$ | 70.87 | 71.78 | 72.3 | 72.49 | 72.94 |
| TSIR | 46.53 | 45.31 | 47.50 | 47.45 | 46.25 |
| TSUV | 49.98 | 48.74 | 51.64 | 53.67 | 51.49 |
| TSET | 58.09 | 57.90 | 59.61 | 60.01 | 59.33 |
| DW nm | 532.9 | 557.2 | 500.2 | 488.6 | 493.7 |
| Pe % | 0.97 | 1.54 | 0.85 | 2.47 | 1.54 |

Referring to Tables 1, 2 and 3, the present invention provides a neutral gray colored glass using a standard soda-lime-silica glass base composition and iron, cobalt, selenium and/or nickel as colorants. Not all of the examples are the same gray color as indicated by the dominant wavelengths (DW) and excitation purities (Pe). In the present invention, it is preferred that the glass be a neutral gray color characterized by dominant wavelengths in the range of 480 to 580 nanometers, preferably 485 to 540 nanometers, with an excitation purity of no higher than 8%, preferably no higher than 3%.

In the present invention, the colorants used to produce a nickel-free neutral gray colored glass with an LTA of 60% or greater at a thickness of 3.9 millimeters include 0.30 to 0.70 wt. % $Fe_2O_3$, no greater than 0.21 wt. % FeO, 3–50 PPM CoO and 1–15 PPM Se. A preferred embodiment of such a glass composition includes 0.32 to 0.65 wt. % $Fe_2O_3$, 0.065 to 0.20 wt. % FeO, 5 to 40 PPM CoO and 1 to 9 PPM Se.

An alternate embodiment of the invention further includes nickel oxide as a colorant. In particular, it has also been found that a neutral gray colored glass with a luminous transmittance of 60% and higher at a thickness of 3.9 millimeters may be attained by using 0.15 to 0.65 wt. % $Fe_2O_3$, no greater than 0.18 wt. % FeO, 15–55 PPM CoO, 0–5 PPM Se and 25–350 PPM NiO as colorants. A preferred embodiment of this alternate glass composition includes 0.17 to 0.60 wt. % $Fe_2O_3$, 0.04 to 0.16 wt. % FeO, 20 to 52 PPM CoO, 0 to 3 PPM Se and at least 50 PPM NiO.

The redox ratio for the glass of the present invention is preferably maintained between about 0.20 to 0.30, and more preferably between 0.24 to 0.28 which is the typical operating range for a conventional overhead fired melting operation. Higher redox levels may be attained by processes disclosed herein, but the use of higher redox ratios is preferably avoided to prevent excessive volatilization of selenium during melting.

Glass made by the float process typically ranges from a sheet thickness of about 1 millimeters to 10 millimeters. For the vehicle glazing applications, it is preferred that the glass sheets have a thickness within the thickness range of 1.8 to 6 millimeters.

If desired, ultraviolet radiation absorbing materials may be added to the glass compositions of the present invention to improve its solar performance. Although not limiting in the present invention, a total of up to 2.0 wt. % of oxides of cerium, vanadium, titanium and molybdenum and combinations thereof may be used as UV absorbers to reduce the TSUV of the glass. In a preferred embodiment of the invention, $TiO_2$ is the preferred UV absorber and may be added in an amount ranging from 0.1 to 1.0 wt. % of the glass composition, and more preferably 0.2 to 0.5 wt. %.

In general, when the glass is used in a forward vision area of a vehicle, it is required that the LTA be 70% or greater. When the required LTA is 70% or greater, the colorants used to produce the nickel-free neutral gray glass of the present invention include 0.30 to 0.70 wt. % $Fe_2O_3$, up to 0.19 wt. % FeO, 3 to 35 PPM CoO and 0 to 10 PPM Se, and preferably 0.32 to 0.65 wt. % $Fe_2O_3$, 0.065 to 0.175 wt. % FeO, 5 to 32 PPM CoO and 1 to 5 PPM Se. The colorants to produce a luminous transmittance of 70% and greater for in the alternate neutral gray glass composition which includes nickel oxide as a colorant include 0.15 to 0.50 wt. % $Fe_2O_3$, up to 0.14 wt. % FeO, 20 to 30 PPM CoO, 0 to 3 PPM Se and 25–200 PPM NiO, and preferably 0.20 to 0.43 wt. % $Fe_2O_3$, 0.05 to 0.11 wt. % FeO, 22 to 27 PPM CoO, 0 to 2 PPM Se and at least 50 PPM NiO.

In addition, for a forward vision area application, it is preferred that the glass composition provide a total solar energy transmittance of no greater than 65%, and more preferably no greater than 60%. This type of performance would make the glass comparable to the performance of standard green automotive glasses.

Other variations as are known to those of skill in the art may be resorted to without departing from the scope of the invention as defined by the claims that follow.

We claim:

1. A neutral gray colored glass composition having a base glass portion comprising:

| | |
|---|---|
| $SiO_2$ | 66 [-] to 75 percent by weight |
| $Na_2O$ | 10 [-] to 20 percent by weight |
| CaO | 5 [-] to 15 percent by weight |
| MgO | 0 [-] to 5 percent by weight |
| $Al_2O_3$ | 0 [-] to 5 percent by weight |
| $K_2O$ | 0 [-] to 5 percent by weight | and a colorant portion consisting essentially of:

| | |
|---|---|
| $Fe_2O_3$ (total iron) | 0.32 to 0.70 percent by weight |
| FeO | up to [0.21] 0.19 percent by weight |
| CoO | 3 [- 50] to 35 PPM |
| Se | 1 [- 15] to 10 PPM | wherein the color of the glass is characterized by dominant wavelengths in the range of 480 to 555 nanometers, an excitation purity of no higher than 8 percent and a luminous transmittance of 70 percent or greater at a thickness of 3.9 millimeters.

2. The composition as in claim 1 wherein the total solar energy transmittance is 65 percent or less.

3. The composition as in claim 2 wherein the $Fe_2O_3$ concentration is from 0.32 to 0.65 weight percent, the FeO concentration is from 0.065 to 0.175 weight percent, the CoO concentration is from 5 to 32 PPM and the Se concentration is from 1 to 5 PPM.

4. The composition of claim 1 wherein the color of the glass is characterized by dominant wavelengths in the range of 485 to 540 nanometers and an excitation purity of no higher than 3%.

5. The composition as in claim 1 further including additional ultraviolet absorbing material.

6. The composition as in claim 5 wherein said ultraviolet absorbing material is an oxide of a material selected from a group consisting of cerium, vanadium, titanium and molybdenum and combination thereof in an amount up to 2.0 wt. % of the glass composition.

7. The composition as in claim 6 wherein said $TiO_2$ is in an amount from 0.1 to 1.0 wt. %.

8. A glass sheet made from the composition as recited in claim 1.

9. The glass sheet as in claim 8 wherein the sheet has a thickness between 1.8 to 6 mm.

10. The glass sheet as in claim 8 wherein the color of the glass is characterized by dominant wavelengths in the range of 485 to 540 nanometers and an excitation purity of no higher than 3%.

11. A neutral gray colored glass composition having a base glass portion comprising:

| | |
|---|---|
| $SiO_2$ | 66 [-] to 75 percent by weight |
| $Na_2O$ | 10 [-] to 20 percent by weight |
| CaO | 5 [-] to 15 percent by weight |
| MgO | 0 [-] to 5 percent by weight |
| $Al_2O_3$ | 0 [-] to 5 percent by weight |
| $K_2O$ | 0 [-] to 5 percent by weight | and a colorant portion consisting essentially of:

| | |
|---|---|
| $Fe_2O_3$ (total iron) | [0.15 to 0.65] 0.17 to 0.60 percent by weight |
| FeO | [up to 0.18] 0.04 to 0.16 percent by weight |
| CoO | [15–55] 20 to 52 PPM |
| Se | 0 [–5] to 3 PPM |
| NiO | [25–350] 50 to 350 PPM | wherein the color of the glass is characterized by dominant wavelengths in the range of 480 to 558.3 nanometers an excitation purity of no higher than 8 percent and a luminous transmittance of 60 percent or greater at a thickness of 3.9 millimeters.

12. The composition as in claim 1 wherein the total solar energy transmittance is 65 percent or less.

13. The composition as in claim 11 wherein the $Fe_2O_3$ concentration is from 0.20 to 0.43 weight percent, the FeO concentration is from 0.05 to 0.11 weight percent, the CoO concentration is from 22 to 27 PPM, and the Se concentration is from 0 to 2 PPM.

14. The composition of claim 12 wherein the color of the glass is characterized by dominant wavelengths in the range of 485 to 540 nanometers and an excitation purity of no higher than 3%.

15. The composition as in claim 11 further including additional ultraviolet absorbing material.

16. The composition as in claim 15 wherein said ultraviolet absorbing material is an oxide of a material selected from a group consisting of cerium, vanadium, titanium and molybdenum and combination thereof in an amount up to 2.0 wt. % of the glass composition.

17. The composition as in claim 16 wherein said $TiO_2$ is in an amount from 0.1 to 1.0 wt. %.

18. A glass sheet made from the composition as recited in claim 11.

19. The glass sheet as in claim 18 wherein the sheet has a thickness between 1.8 to 6 mm.

20. The glass sheet as in claim 18 wherein the color of the glass is characterized by dominant wavelengths in the range of 485 to 540 nanometers and an excitation purity of no higher than 3%.

21. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.32 to 0.70 percent by weight |
| FeO | up to 0.21 percent by weight |
| CoO | 3 to 50 PPM |
| Se | 1 to 15 PPM | wherein the color of the glass is characterized by dominant wavelengths in the range of 480 to 555 nanometers, an excitation purity of no higher than about 8 percent, a luminous transmittance of greater than 70 percent, and a total solar energy transmittance of 65 percent or less at a thickness of 3.9 millimeters.

22. The composition of claim 21 wherein the color of the glass is characterized by dominant wavelengths in the range of 485 to 540 nanometers and an excitation purity of no higher than 3% at a thickness of 3.9 millimeters.

23. The composition as in claim 21 further including additional ultraviolet absorbing material.

24. A glass sheet made from the composition as recited in claim 21.

25. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| Fe$_2$O$_3$ (total iron) | 0.32 to 0.70 percent by weight |
| FeO | up to 0.21 percent by weight |
| CoO | 3 to 50 PPM |
| Se | 1 to 15 PPM | wherein the color of the glass is characterized by dominant wavelengths in the range of 480 to 555 nanometers, an excitation purity of no higher than 8 percent and a luminous transmittance of greater than 70 percent at a thickness of 3.9 millimeters.

26. The composition as in claim 25 wherein the color of the glass is characterized by dominant wavelengths in the range of 485 to 540 nanometers and an excitation purity of no higher than 3 percent at a thickness of 3.9 millimeters.

27. A neutral gray colored glass composition having a base glass portion comprising:

| | |
|---|---|
| SiO$_2$ | 66 to 75 percent by weight |
| Na$_2$O | 10 to 20 percent by weight |
| CaO | 5 to 15 percent by weight |
| MgO | 0 to 5 percent by weight |
| Al$_2$O$_3$ | 0 to 5 percent by weight |
| K$_2$O | 0 to 5 percent by weight | and a colorant portion consisting essentially of:

| | |
|---|---|
| Fe$_2$O$_3$ (total iron) | greater than 0.15 up to 0.65 percent by weight |
| FeO | up to 0.18 percent by weight |
| CoO | 15 to 55 PPM |
| Se | 0 to 3 PPM |
| NiO | 25 to 350 PPM | wherein the glass has a luminous transmittance of greater than 60 percent at a thickness of 3.9 millimeters.

28. The composition as in claim 27 wherein the color of the glass is characterized by dominant wavelengths in the range of 480 to 580 nanometers and an excitation purity of no higher than 8 percent at a thickness of 3.9 millimeters.

29. The composition of claim 27 wherein the color of the glass is characterized by dominant wavelengths in the range of 485 to 540 nanometers and an excitation purity of no higher than 3% at a thickness of 3.9 millimeters.

30. The composition as in claim 27 wherein the Fe$_2$O$_3$ concentration is from 0.17 to 0.60 weight percent.

31. The composition as in claim 27 wherein the total solar energy transmittance is 65 percent or less.

32. The composition as in claim 27 further including additional ultraviolet absorbing material.

33. A glass sheet made from the composition as recited in claim 27.

34. The composition as in claim 27 wherein the Fe$_2$O$_3$ concentration is from 0.17 to 0.50 weight percent, the FeO concentration is up to 0.14 weight percent, the CoO concentration is from 20 to 30 PPM, the Se concentration is from 1 to 3 PPM and the NiO concentration is 25 to 200 PPM and further wherein said composition has a luminous transmittance of 70 percent or greater at a thickness of 3.9 millimeters.

35. The composition as in claim 21 wherein the Fe$_2$O$_3$ concentration is from 0.32 to 0.65 weight percent, the FeO concentration is from 0.065 to 0.20 weight percent, the CoO concentration is from 5 to 40 PPM and the Se concentration is from 1 to 9 PPM.

* * * * *

UNITED STATES PATENT AND TRADEMARK OFFICE
CERTIFICATE OF CORRECTION

PATENT NO.    : 6,114,264
DATED         : September 5, 2000
INVENTOR(S)   : Krumwiede et al.

Page 1 of 1

It is certified that error appears in the above-identified patent and that said Letters Patent is hereby corrected as shown below:

Column 9,
Line 30, claim 11, should read as follows:

11. A neutral gray colored glass composition having a base glass portion comprising:

| | | |
|---|---|---|
| | $SiO_2$ | 66 to 75 percent by weight |
| | $Na_2O$ | 10 to 20 percent by weight |
| | $CaO$ | 5 to 15 percent by weight |
| | $MgO$ | 0 to 5 percent by weight |
| | $Al_2O_3$ | 0 to 5 percent by weight |
| | $K_2O$ | 0 to 5 percent by weight | and a colorant portion consisting essentially of:

| | | |
|---|---|---|
| | $Fe_2O_3$ (total iron) | 0.17 to 0.60 percent by weight |
| | FeO | 0.04 to 0.16 percent by weight |
| | CoO | 20 to 52 PPM |
| | Se | 0 to 3 PPM |
| | NiO | 50 to 350 PPM | wherein the color of the glass is characterized by dominant wavelengths in the range of 480 to 558.3 nanometers, an excitation purity of no higher than 8 percent and a luminous transmittance of 60 percent or greater at a thickness of 3.9 millimeters.

Line 57, "as in claim 1" should read -- as in claim 11 --.
Line 64, "of claim 12" should read -- of claim 11 --.

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,114,264
DATED : September 5, 2000
INVENTOR(S) : Krumwiede et al.

It is certified that error appears in the above-identified patent and that said Letters Patent is hereby corrected as shown below:

<u>Column 8,</u>
Line 46, claim 1, should read as follows:

1. A neutral gray colored glass composition having a base glass portion comprising:

| | | |
|---|---|---|
| | $SiO_2$ | 66 to 75 percent by weight |
| | $Na_2O$ | 10 to 20 percent by weight |
| | CaO | 5 to 15 percent by weight |
| | MgO | 0 to 5 percent by weight |
| | $Al_2O_3$ | 0 to 5 percent bv weight |
| | $K_2O$ | 0 to 5 percent by weight | and a colorant portion consisting essentially of:

| | | |
|---|---|---|
| | $Fe_2O_3$ (total iron) | 0.32 to 0.70 percent by weight |
| | FeO | up to 0.19 percent by weight |
| | CoO | 3 to 35 PPM |
| | Se | 1 to 10 PPM | wherein the color of the glass is characterized by dominant wavelengths in the range of 480 to 555 nanometers, an excitation purity of no higher than 8 percent and a luminous transmittance of 70 percent or greater at a thickness of 3.9 millimeters.

UNITED STATES PATENT AND TRADEMARK OFFICE
CERTIFICATE OF CORRECTION

PATENT NO. : 6,114,264
DATED : September 5, 2000
INVENTOR(S) : Krumwiede et al.

It is certified that error appears in the above-identified patent and that said Letters Patent is hereby corrected as shown below:

<u>Column 9,</u>
Line 30, claim 11, should read as follows:

11. A neutral gray colored glass composition having a base glass portion comprising:

| | |
|---|---|
| $SiO_2$ | 66 to 75 percent by weight |
| $Na_2O$ | 10 to 20 percent by weight |
| CaO | 5 to 15 percent by weight |
| MgO | 0 to 5 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.17 to 0.60 percent by weight |
| FeO | 0.04 to 0.16 percent by weight |
| CoO | 20 to 52 PPM |
| Se | 0 to 3 PPM |
| NiO | 50 to 350 PPM | wherein the color of the glass is characterized by dominant wavelengths in the range of 480 to 558.3 nanometers, an excitation purity of no higher than 8 percent and a luminous transmittance of 60 percent or greater at a thickness of 3.9 millimeters.

Line 57, "as in claim 1" should read -- as in claim 11 --.
Line 64, "of claim 12" should read -- of claim 11 --.

This certificate supersedes Certificate of Correction issued March 30, 2004.

Signed and Sealed this

Eleventh Day of May, 2004

JON W. DUDAS
*Acting Director of the United States Patent and Trademark Office*

Adverse Decision In Interference

Patent No. 6,114,264, John F. Krumwiede, Anthony V. Longobardo, Larry J. Shelestak, GRAY GLASS COMPOSITION, Interference No. 105,147, final judgment adverse to the patentees rendered December 22, 2004, as to claims 1-35.

*(Official Gazette February 22, 2005)*